United States Patent [19]

Petsch et al.

[11] 4,454,573
[45] Jun. 12, 1984

[54] CURRENT REGULATOR CIRCUIT

[75] Inventors: Johann Petsch, Poing, Fed. Rep. of Germany; Eric F. Kohn, Le Petit-Lancy-Genf, Switzerland

[73] Assignee: ASR Servotron AG, Le Petit-Lancy-Genf, Switzerland

[21] Appl. No.: 406,477

[22] Filed: Aug. 9, 1982

[30] Foreign Application Priority Data

Aug. 10, 1981 [DE] Fed. Rep. of Germany ....... 3131574

[51] Int. Cl.³ .......................... G05B 11/28; H02P 5/16
[52] U.S. Cl. ...................................... 363/98; 318/341; 318/599; 318/601
[58] Field of Search ............................ 363/17, 97–98, 363/131–134; 318/341, 599, 600, 601, 603, 345 R, 345 E, 345 F

[56] References Cited

U.S. PATENT DOCUMENTS

| 4,066,945 | 1/1978 | Korte, Jr. | 318/599 X |
| 4,223,255 | 9/1980 | Goldman et al. | 318/138 |
| 4,223,258 | 9/1980 | Lacy | 318/599 |
| 4,242,621 | 12/1980 | Spaulding | 318/603 X |
| 4,259,626 | 3/1981 | Nomura et al. | 318/599 |
| 4,388,570 | 6/1983 | Sangree | 318/601 X |

FOREIGN PATENT DOCUMENTS

| 2233188 | 1/1974 | Fed. Rep. of Germany . |
| 2747476 | 6/1978 | Fed. Rep. of Germany . |
| 2714302 | 10/1978 | Fed. Rep. of Germany . |
| 2818800 | 11/1979 | Fed. Rep. of Germany . |
| 2434511 | 3/1980 | France . |
| 2029136 | 3/1980 | United Kingdom . |

OTHER PUBLICATIONS

M. Schulze et al., "Transistor-Gleichstromsteller fuer reaktionsschnelle Antriebe Kleiner Leistung", Elektrie 28, (1974), H.7, pp. 368–370.

M. Julliere et al., "An 'H'-type Switching Mode Power Supply for D.C. Servo Motors", International Journal of Electronics, vol. 46, No. 5, pp. 507–512.

U. Claussen et al., "Motorregelung mit Mikrorechner", Regelungstech-nische Praxis, 1978, Heft 12, pp. 355–359.

Primary Examiner—Peter S. Wong
Attorney, Agent, or Firm—Pennie & Edmonds

[57] ABSTRACT

A digital current regulator circuit, especially useful for a DC motor, is described which is fed directly, i.e., without power transformers, from the AC mains, via power transistors (T1-T4) that are controlled by pulse modulation and which can work in four-quadrant operation. An A/D converter (12) generates from samples of the motor current, an actual-value signal in the form of a multi-bit parallel binary code; and a binary comparator (20) compares the actual-value code with a theoretical-value code and generates binary error signals if the actual value is greater or less than the theoretical value. To provide DC-isolation of the power transistors and associated circuitry from the control circuitry that generates the error signals, the parallel bits of the actual-value code are transmitted to the control circuitry through an opto-electronic coupler (14). Other opto-electronic couplers (16, 30) can be provided to transmit other control signals.

10 Claims, 2 Drawing Figures

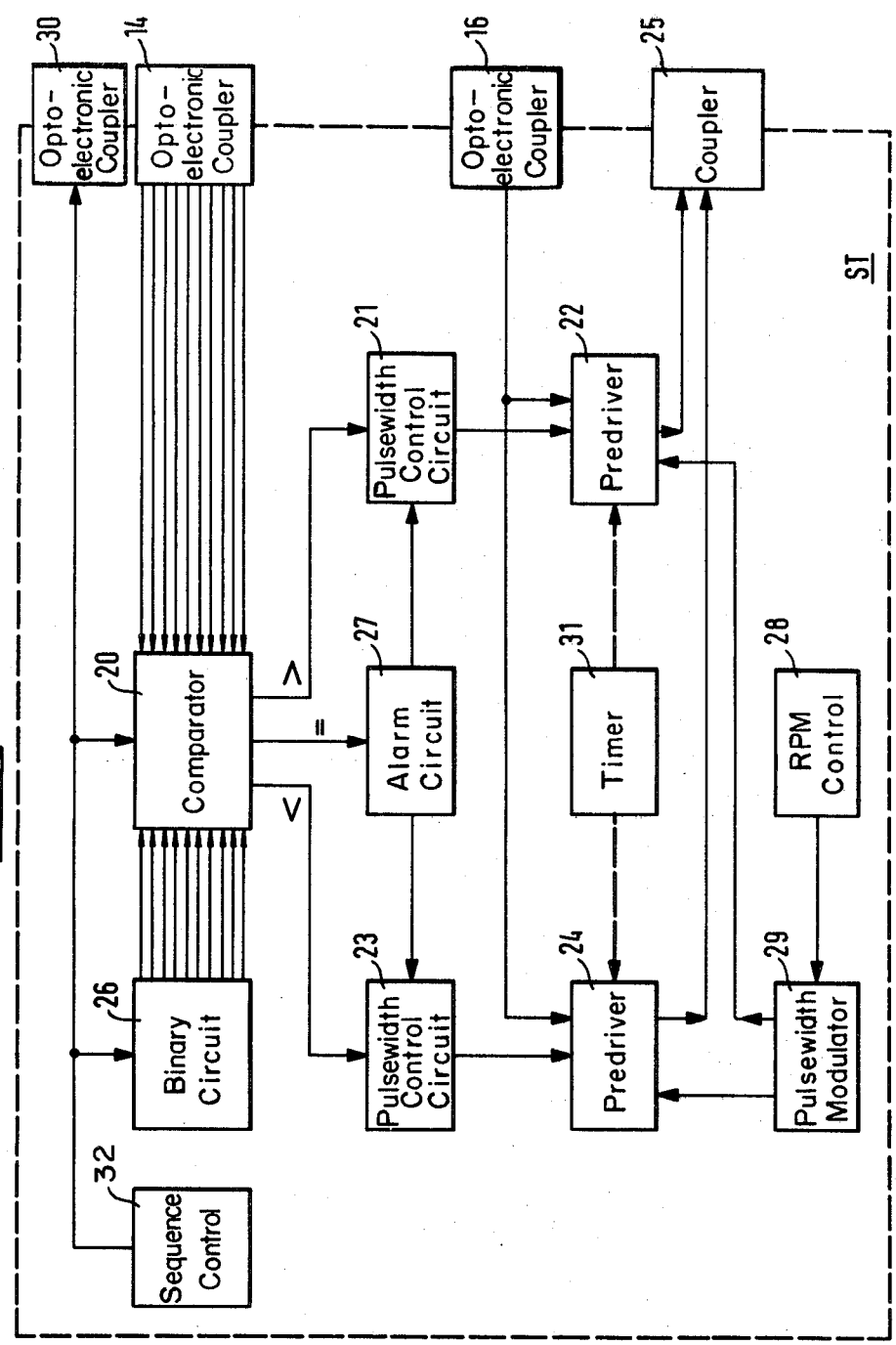

CURRENT REGULATOR CIRCUIT

BACKGROUND ART

This invention concerns a current regulator circuit for a load that is controlled by a power driver stage, for example, for a DC motor that is controlled by pulse-width modulation or by timing pulses.

In some current regulator circuits such as those used for servo motors, a power driver stage comprises four transistors connected as a bridge with the motor being connected between the bridge diagonals. In such circuits the current that flows in the two bridge diagonals is measured, and the actual analog voltages generated by such measurements are conducted directly to a comparison point in a control stage, with the comparison point being DC-connected to the power driver stage. An error signal is generated upon comparison of the actual analog voltage with a desired or theoretical value, which is likewise present in analog form. The error signal is then amplified by a control amplifier with PI (proportional-integral) time behavior to produce an output voltage that controls the duty cycle of the bridge diagonals.

With prior art systems a disadvantage of the analog current regulator circuit is its low bandwidth which is on the order of 1 kHz. The circuit responds so slowly to changes in the load current as a consequence, for example, of overshoot processes or interference that for safety reasons the current must be limited to a value that is considerably less (e.g., 30% less) than the peak current that is intrinsically allowable. Even more important problems arise if one wants to connect transistors that are suitable for high voltages directly to the existing AC main without the intermediate connection of expensive power transformers. Such transistors are presently available for power driver stages, and their direct connection can be effected through a rectifier arrangement. In this case, however, one must take care to provide DC isolation of the power driver stage from the control stage including its power supply and from all the remaining electronic control mechanisms of the system, which frequently includes a process computer or other data processing system. The necessary DC isolation makes it difficult to reach a high transmission bandwidth, a good linearity, and the desired accuracy and resolution of the regulator circuit. It is particularly difficult to transmit the actual-value signal, corresponding to the load current, into the control stage with the desired bandwidth. Further problems arise if essential elements of the control circuit must be situated in the isolated power driver stage where they require a separate current supply system.

DISCLOSURE OF THE INVENTION

The present invention is directed to a current regulator circuit for a high-power power driver stage that is controlled with pulse-width or similar modulation. While this power driver stage may be completely DC isolated from its control stage, the regulator circuit enables a high bandwidth without requiring complex and expensive intermediate stages. It operates as linearly as possible, and responds to current changes more rapidly and more precisely than previously.

In accordance with the invention, a digital current regulator circuit is fed directly, i.e., without power transformers, from the AC mains, via power transistors that are controlled by pulse modulation and which can work in four-quadrant operation. An A/D converter generates from samples of the motor current an actual-value signal in the form of a multi-bit binary code. A binary comparator compares the parallel bits of the actual-value signal with a theoretical-value code and generates binary error signals if the actual value is greater or less than the theoretical value. To provide DC-isolation of the power transistors and associated circuitry from the control circuitry that generates the error signals, the bits of the actual-value code are transmitted to the control circuitry through an opto-electronic coupler. Other opto-electronic couplers can be provided to transmit other control signals.

Such a regulator circuit has a considerably improved bandwidth of 100 kHz or more despite of the DC-decoupling without requiring expensive intermediate stages or particular control circuitry in the power stage. The invention has the further advantage that the regulation accuracy is improved and the load can be supplied with the maximum possible current, since no significant safety margin must be preserved in order to take into account the regulator inertia. If excess curent is drawn by the motor, for instance as a consequence of a short circuit, a very rapid shut-off is possible. Additional protective measures may be provided very easily, for example, to detect from the binary codes errors in the regulator operation such as sign deviations. Digital operation also makes possible a pure P-regulator characteristic. The binary error signal generated by the comparator can directly control the pulse length (duty cycle) of the final stage without a follow-up control amplifier.

The described current regulator circuit also makes possible a simpler and more liberal adjustment of the theoretical-value signal than was possible previously, permitting such adjustments to be made, for example, in accord with a computer program or according to a prescribed current curve with relatively rapid changes, as is required in some cases. If an rpm control should be necessary, this can be taken into account independently of the theoretical-value signal.

The current regulator circuit is especially suitable for the direct connection of the power driver stage to the AC mains without a power transformer, but with DC-decoupling of the control stage. While the use of opto-electronic coupling elements to provide DC-isolation is known, use of such coupling elements with the current regulator circuit described herein has special advantages. These advantages include undelayed transmission of the actual-value code and possibly also of positioning signals, which contributes to a high bandwidth. Another advantage is the avoidance of cross-talk and chatter, since the coupling elements do not interfere with one another and are not influenced by external interferences. Furthermore, in contrast to magnetic transmitters, opto-electronic couplers make possible the static, time-unlimited transmission of binary signals.

BRIEF DESCRIPTION OF THE DRAWINGS

These and other objects, features and advantages of our invention will be more readily apparent from the following description of the best mode of practicing the invention in which:

FIG. 2 is a schematic block circuit diagram of a control stage that is connected ahead of the power driver stage in an illustrative embodiment of our invention.

BEST MODE FOR CARRYING OUT THE INVENTION

Figure 1:
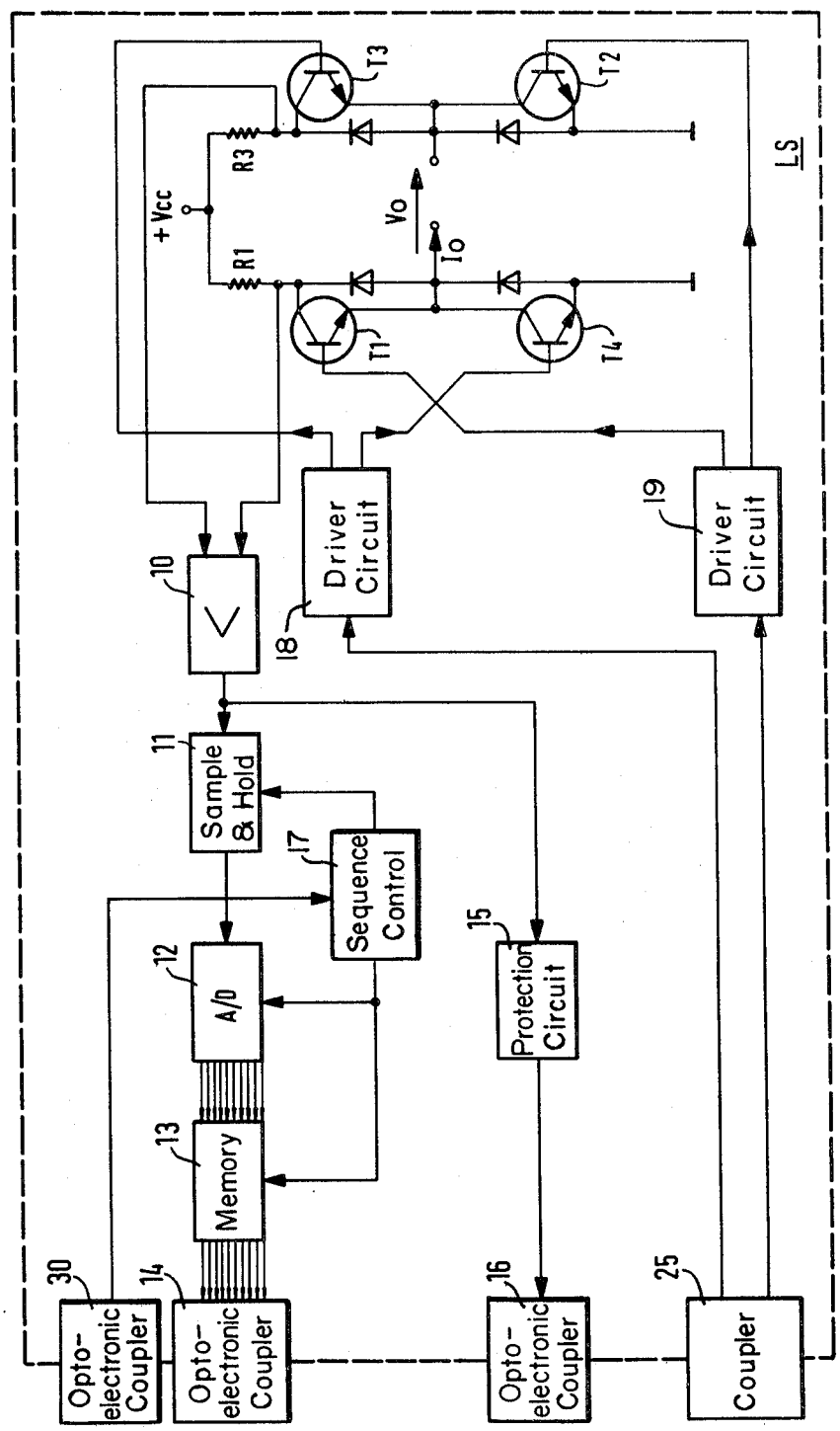
FIG. 1 is a schematic block diagram of a power driver stage of an illustrative embodiment of our invention.

As shown in the illustrative embodiment of a power driver stage LS in FIG. 1, a bridge circuit comprising four transistors T1 through T4 and four diodes is connected through resistors R1 and R3 to a DC voltage source $+V_{CC}$. As is well known, these transistors can be controlled by pulse width modulation so that the output voltage $V_0$ is variable between zero and a maximum voltage. The output voltage $V_0$, which supplies a motor such as a servo motor (not shown), can also be repoled through the bridge circuit. The motor can thus operate in four-quadrant operation, i.e. it can be driven so as to run clockwise or counter-clockkwise and can also be braked while delivering current.

Voltage source $+V_{CC}$ can be connected directly to existing AC or three-phase mains at a high voltage of, for example, 380 V or more. This connection is preferably made through a rectifier and smoothing circuit (not shown) without a power transformer. Certain other positive and negative operating voltages that are needed for operation of electronic circuits in the power driver stage LS are likewise derived from the AC mains through transformers and DC voltage regulators. These voltages are referred to $+V_{CC}$. On the other hand, the operating voltage supply of the control stage ST shown in FIG. 2 is independent of the voltage supply of power driver stage LS and in particular is DC-isolated therefrom.

In the illustrative embodiment of FIG. 1, the current $I_0$, which flows in the motor, is measured by tapping the voltage drop either at resistor R1 when transistors T1 and T2 are conducting or at resistor R3 when transistors T3 and T4 are conducting. Since the output voltage $V_0$ is modulated with a relatively high frequency, the motor inductance smoothes the current to practically a DC current. Alternatively, the motor current can be determined by transformers, Hall probes, isolation amplifiers, etc. instead of by resistors. In any case, such current measurement in the upper quadrants of the bridge circuit has the special advantage that not only the normal current values but also short-circuit currents, for example, due to an armature short circuit to the ground, can be directly detected.

The voltages at the node between resistor R1 and transistor T1 and that between resistor R3 and transistor T3 are fed to an amplifier circuit 10 that is used to detect the measured values. This circuit contains an operational amplifier that forms and amplifies the difference of the two voltages obtained from the bridge diagonals. Amplifier circuit 10 simultaneously normalizes the amplification for matching the regulator circuit to the desired maximum current. To limit the regulation bandwidth, a filter (not shown) at the input of the amplifier circuit 10 can be used to suppress switching spikes and other high-frequency interferences.

A sample and hold circuit 11 is connected to the output of the amplifier circuit 10. This sample and hold circuit is controlled by the timing pulses from a local sequence control unit 17. Circuit 11 cyclically samples the analog output signals of the amplifier circuit 10, stores them, and delivers them to an A/D converter 12 with the prescribed switching frequency of the system. A/D converter 12 which is likewise controlled by the timing signals from the sequence control unit 17, converts analog input signals into corresponding digital signals. To provide for wide transmission bandwidth, the A/D converter should have a high conversion rate. The digital signals, which constitute an actual-value code consisting, for example, of 10 parallel bits, are first stored in a memory 13 at the output of the A/D converter 12 that comprises latch- or signal-memories.

The parallel bits of the actual-value code are read from memory 13 by sequence control unit 17 under timing-pulse control. During the read phase, they are transmitted noise-free in parallel over opto-electronic couplers, which in their totality are designated by 14, from the power driver stage LS into a control stage ST shown in FIG. 2. As is well known, such couplers comprise a light transmitter such as a light-emitting diode and a receiver such as a photo transistor.

In the case of excess current, protective measures can be triggered by a protection circuit 15 connected to the output of amplifier circuit 10. In the case of an unwanted excess current, such a circuit generates a binary signal that is transmitted into the control stage ST through another opto-electronic coupler 16. There, it is fed to predrivers to switch off the power driver stage. Alternatively, protection circuit 15 can have its input side connected to the outputs of the A/D converter and can evaluate the actual-value code.

As shown in the control stage ST of FIG. 2, the parallel bits of the actual-value code from coupler 14 are applied to a first group of inputs to comparator 20. Comparator 20 also has a second group of inputs to which are applied the parallel bits of a theoretical-value code that specifies the current $I_0$ (FIG. 1) that is supposed to flow in the motor or other load. When the actual-value signal is greater than the theoretical-value signal, comparator 20 generates a binary error signal at the output L. This error signal is fed to a pulse-width control circuit 21, which on its part switches a predriver 22 for a bridge diagonal ("left"). Illustratively, control circuit 21 includes a signal memory. In corresponding fashion, when the measured current expressed by the actual-value code is less than the theoretical-value signal, comparator 20 generates an error signal at output R, and this signal is fed through a control circuit 23 to a predriver 24 for the other bridge diagonal ("right"). The positioning signals of the predrivers 22, 24 are transmitted through the couplers 25 to the driver circuits of the power driver stage LS of FIG. 1. The couplers 25 can be optical or magnetic in nature.

The theoretical-value code is generated by a binary circuit 26 either as a preset constant value or variably in dependence on conditions that correspond to the particular application, for example, in accord with a computer program or in accord with a prescribed alteration curve. Because this value is a binary value, this can be done relatively easily. In the example under consideration, which involves a motor control, the theoretical value can be the allowed peak value of the motor. The theoretical-value and actual-value codes are conducted to comparator 20 through buffer memories and input filters (not shown) which permit the data to be changed with at most half the bandwidth of the current regulator circuit.

In contrast to known motor-control systems, the current regulator circuit described herein preferably does not generate the theoretical value of the armature current from a separate rpm control. If an rpm control 28 is provided, its output signal can act directly on a pulse-width modulator 29. The output of the pulse-width modulator 29 can be linked logically with the error signal from control circuits 21 or 23 by gate elements (not shown) contained, for example, in predrivers 22, 24. These gate elements can be controlled at another input by circuits that provide protective functions.

The actual-value code generated by the A/D converter 12 and the theoretical-value code are preferably a two's complement code. This has the advantage of being symmetric on both sides to a uniquely defined zero value so that the same code numbers are used for positive and negative values of equal magnitude. Use of such code also permits a very simple determination of the sign corresponding to the particular operating quadrant of the motor (current direction). Advantageously, the signs of both the theoretical-value code and the actual-value codes are examined by the comparator 20 for discrepancies. If the magnitudes of the actual-value and theoretical-value signals agree but their signs differ due to some interference, an alarm is generated at a third output from the comparator. This alarm signal can be stored in an alarm circuit 27 and can be used to switch off the power driver stage, for example, through the control circuits 21, 23 and the predrivers 22, 24.

The control stage ST contains a sequence control unit 32. The latter is coupled to sequence control unit 17 of the power driver stage LS through an optoelectronic coupler 30 and is synchronized with control unit 17. Control unit 32 provides the timing signals for binary circuit 26 and comparator 20, and thus controls the input and output of the two codes to and from the signal memories at the inputs of comparator 20.

To perform the parallel comparison between the two codes, comparator 20 can contain commercial magnitude-comparator circuits such as the MM54C85/MM74C85 from the National Semiconductor Company, which produces the desired three output signals for "greater than", "less than", and "equal to".

With the conventional pulse-width modulation of the transistor bridge shown in FIG. 1, the output voltage $V_0$ is set to all values between nearly $+V_{CC}$ and $-V_{CC}$ by selecting the pulse-duty factor between the two bridge diagonals by simultaneously switching in each case the transistors of one diagonal (T1 and T2 or T3 and T4). The switchover is always effected with a short currentless pause for all transistors.

Instead of this, a control principle can be used which is more favorable in various aspects. With this principle, one transistor of one or the other diagonal is always conducting; and only the second transistor of the relevant diagonal is controlled in terms of the pulse-width, while the other diagonal remains blocked. The choice of transistors here depends on the current direction. This unipolar control principle is advantageous because, among other things, the controlled transistor can be switched off without delay; and it is possible to achieve greater independence from interference as well as lower expense, especially for the usual load-relief networks of the power transistors. However, this technique requires time-discrete control of the transistors in which the transistors can be switched only at precisely defined points in time determined by the timing pulses of a system timer 31 in FIG. 2. This unit is synchronized with the operation of the regulator circuit.

The digital regulator cirucit described here can be combined especially effectively with the time-discrete control system that has a unipolar mode of operation. According to this principle of the unipolar time-discrete activation of the power transistors, which must be distinguished from the conventional principle of pulse-width modulation, the power transistors T1 through T4 can be switched on and off only at times that are defined by the timing signal from timer 31. For the case of a positive current direction of the motor, for example, the transistors have the following conducting states:

T4 and T3 always blocked; T1 always conducting;
T2 conducting if $I_{actual} < I_{theoretical}$;
T2 blocked if $I_{actual} > I_{theoretical}$, where $I_{actual}$ is specified by the actual-value code and $I_{theoretical}$ is specified by the theoretical-value code. On the other hand, if a negative current direction has been set, the following condition results:

T1 and T2 blocked; T3 always conducting;
T4 conducting if $I_{actual} < I_{theoretical}$;
T4 blocked if $I_{actual} > I_{theoretical}$.

With a given current direction, the current magnitude is thus controlled with only one of the four power transistors. In the case of a positive current direction, this is the transistor T2. For example, when the motor is accelerated with its peak current, and also during design-speed operation, where the current is generally less, transistor T2 can remain conducting for one or more timing periods, depending on the load or motor inductance. With each timing pulse, the comparator 20 determines whether the theoretical value has been reached or has already been exceeded, and whether the transistor T2 should possibly be blocked for one or more timing periods until the current has again reached the theoretical value, etc.

To avoid delays it is appropriate to transmit the codes representing the actual-value signal in parallel to the control stage ST. It is also possible, however, under certain circumstances, to transmit the bits serially and to apply them to the comparison switching unit by way of a series-parallel converter, if the operating speed of the available converters is sufficient for the respective case. Series transmission is of interest, for example, when the actual-value code is not to be transmitted by way of the aforementioned opto-electronic couplers which require a closely adjacent arrangement of the coupler transmitters and receivers and thus of the two stages LS and ST, but rather by way of at least one glass fiber line which makes possible a considerable spatial separation and, among others, even more freedom from interference.

As will be apparent to those skilled in the art, numerous variations may be made in the above described invention. Other semi-conductor components such as gate-turnoff thyristors may be used in place of the power transistors of the power driver stage. Other coupling arrangements may be used between the control stage and the power driver stage. And while the invention has been described with respect to a motor working in four-quadrant operation; the regulator circuit may be used for other loads as well.

What is claimed is:

1. A current regulator circuit for a DC load comprising:
    a power driver stage comprising:
        power switches connected in a bridge circuit, and
        means for generating an actual-value signal corresponding to the current flowing in the load, and
    a control stage comprising:
        means for comparing the actual-value signal with a theoretical-value signal and generating error signals corresponding to the difference, means for using said error signals to control the power switches, and means for DC-isolating the power driver stage characterized in that:

the generating means comprises an A/D converter which generates the actual-value signal as a binary code having a multiplicity of bits, based on its sampling of the current that flows in the load, the comparing means compares the actual-value signal in the form of parallel bits with the theoretical-value signal, where the latter likewise consists of a plurality of parallel bits and corresponds to a prescribed or desired load current, and generates different outputs depending on whether the actual value is greater or less than the theoretical value, and the actual-value signal is coupled from the power driver stage to the control stage by an opto-electronic coupler.

2. A current regulator circuit according to claim 1 further characterized in that:

an input to the A/D converter is connected with a sample and hold circuit that cyclically samples the load current, stores the sample values, and delivers them to the A/D converter, an output from the A/D converter is connected to a signal memory that is connected in turn to said comparing means, and timing signals from a sequence control unit control said sample and hold circuit, said A/D converter, said signal memory and said comparing means.

3. A current regulator circuit according to claim 2 further characterized in that:

the bridge circuit comprises power transistors, and an operational amplifier is connected between the power transistors and the sample and hold circuit, said operational amplifier forming the difference of the current values of the two bridge diagonals, from which is formed the actual-value signal.

4. A current regulator circuit according to claim 3 further characterized in that a filter is connected between the power transistors and the sample and hold circuit to limit the regulator bandwidth.

5. A current regulator circuit according to claim 1 further characterized in that the actual-value signal is conducted to a protective circuit that responds to an unallowed excess current by generating a binary excess-current signal that is transmitted into the control stage through an opto-electronic coupling element and applied to pre-drivers for the power driver stage.

6. A current regulator circuit according to claim 1 further characterized in that at least one of the actual-value signal and the theoretical-value signal is conducted to the comparing means through a buffer- and signal-storage means and through an input filter, which limits the rate of change of the respective code to approximately half the bandwidth of the current regulator circuit.

7. A current regulator circuit according to claim 1 further characterized in that the theoretical-value and actual-value signals are transmitted in two's complement to the comparing means and the comparing means checks the sign of the theoretical-value and actual-value signals and generates an alarm signal in the event of a sign deviation.

8. A current regulator circuit according to claim 1 further characterized in that error signals generated by the comparing means are applied to gate elements in the control stage that are controlled by the output signal of a modulator.

9. A current regulator circuit according to claim 8 further characterized in that the modulator is controlled by an rpm control for the motor that is driven by the power driver stage.

10. A current regulator circuit according to claim 1 further characterized in that the actual-value signal is transmitted into the control stage by way of at least one glass fiber line.

* * * * *